Sept. 17, 1968      B. MORRISON      3,401,411
UPHOLSTERY CONSTRUCTION
Filed March 10, 1967      2 Sheets-Sheet 1
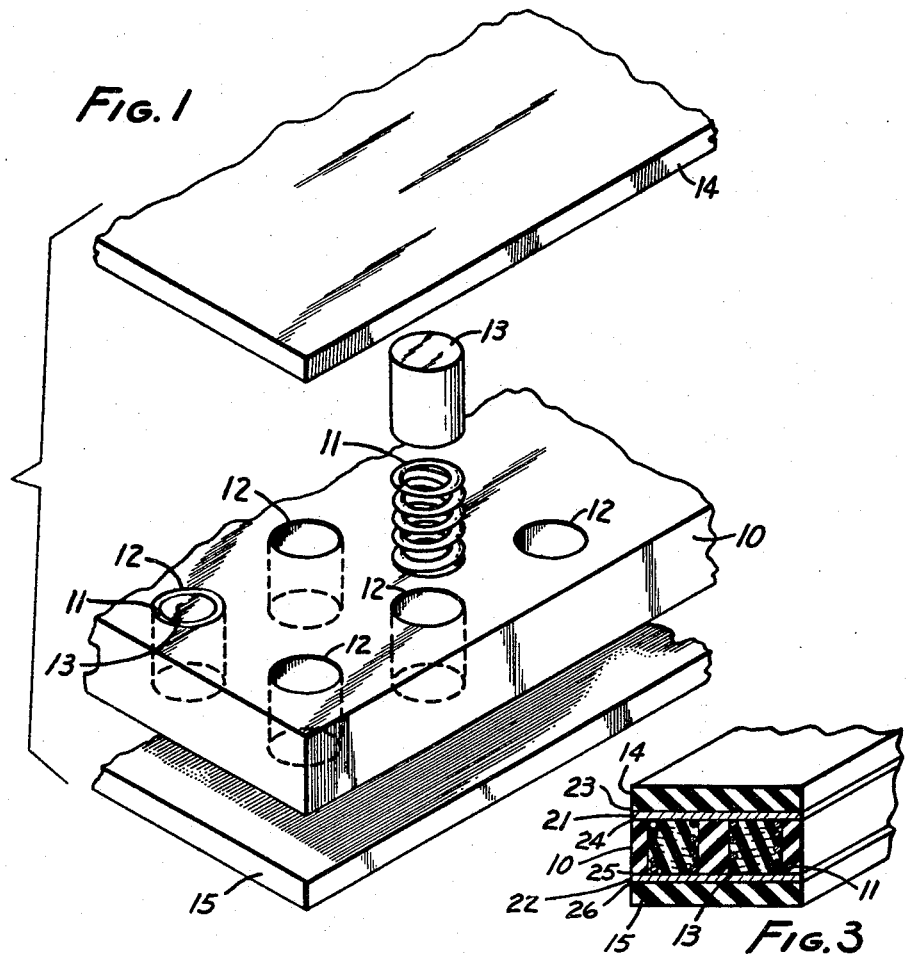
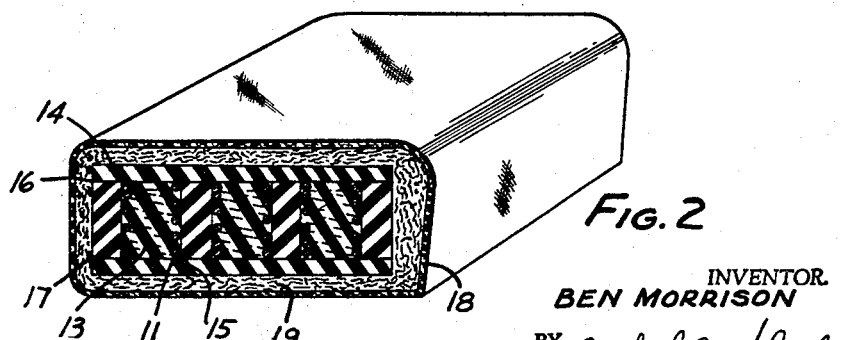
INVENTOR.
BEN MORRISON
BY *Michael M Schuster*
AGENT Sept. 17, 1968  B. MORRISON  3,401,411
UPHOLSTERY CONSTRUCTION
Filed March 10, 1967  2 Sheets-Sheet 2

INVENTOR.
BEN MORRISON
BY Michael M Schuster
AGENT.

United States Patent Office 3,401,411
Patented Sept. 17, 1968

3,401,411
UPHOLSTERY CONSTRUCTION
Ben Morrison, 11124 Westwood Blvd.,
Culver City, Calif. 90230
Continuation-in-part of application Ser. No. 497,214,
Oct. 18, 1965. This application Mar. 10, 1967, Ser.
No. 622,151
6 Claims. (Cl. 5—353)

ABSTRACT OF THE DISCLOSURE

This invention consists of three layers of elastomeric foam material, the central core layer containing coil springs which are internally supported by cores cut from the parent central core material and two outer sheets which encase both sides of the central core sheet. Another variation of the invention provides for bonding the central core sheet to a sub-spring layer or structure which is fixed to the frame of an article of furniture; one sheet of foam material being bonded to the upper surface of the core sheet.

---

This invention is a continuation-in-part of the inventor's co-pending patent application Ser. No. 497,214, filed Oct. 18, 1965, now Patent No. 3,310,819 bearing the title Upholstery Construction.

This invention relates to methods of upholstery construction.

An object of this invention is to utilize layers of elastomeric materials of various resiliencies in an efficient manner to achieve layered upholstery construction.

A further object of this invention is to utilize the effects of coil springs within a layer of elastomeric foam upholstery core construction to improve the core assembly strength and resiliency.

A further object of this invention is to use one layer of the elastomer foam material itself as the self-pocketing material for steel coil springs.

A further object of the invention is to reuse material removed from a layer of foam to create a pocket within the coil spring, as a reinforcing member without the use of additional material.

A further object of this invention is to provide reinforcing material to prevent the coil springs from piercing the foam elastomeric layers.

A still further object of this invention is to provide said reinforcing material in such a manner to prevent piercing the foam elastomeric layers as well as to prevent wear upon the pockets cut into the material which the steel coil springs are inserted into.

Another object of this invention is to provide a construction utilizing the spring reinforced, pocketed sheet foam material in conjunction with a sub-base assembly to provide an upholstery base for cushion structure.

The foregoing objects and other features of this invention will be better understood from the following detailed description of the associated accompanying drawings of which:

FIG. 1 is an exploded perspective view of an embodiment of the invention showing parts in relative position before assembling;

FIG. 2 is a sectioned-perspective view of the embodiment of the invention in FIG. 1 assembled and contained in a cushion;

FIG. 3 is a sectioned-perspective view of another embodiment of the invention;

Figure 4:
FIG. 4 is a perspective view partially in cross-section, of an embodiment of a coil-spring assembly.

The embodiment of the invention shown in FIG. 1 would be used, in general, as the central coil unit to be utilized in a unit construction as the core for further upholstery to construct cushions, mattresses, or upholstered furniture, or any other such application.

Elastomeric foam such as polyurethane foam is preferred for the construction of this invention but the invention is applicable to other cellular elastomeric material such as sponge rubber, synthetic rubber and similar substances.

Polyurethane foams are available in many densities, the resiliency, in general, decreasing as the density increases. Conversely, the cost of the material increases as the density increases. Therefore, it is advantageous to use a low density polyurethane foam for as much of the structure as is possible. This is provided in the instant invention by adding to the resiliency of a central core sheet 10 of low density polyurethane foam by utilizing coil springs 11. Outer sheets 14 and 15 of the core unit are made of a higher density, lower resiliency polyurethane foam to help distribute load between the coil springs of the unit. The ratio between densities of the central core sheet 10 polyurethane foam and the outer sheets 14 and 15 may be in the order of 3 to 1 with higher or lower ratios dependent on intended usage and cost factors.

In building the central coil spring-foam unit the following construction is used. A core sheet 10 of polyurethane foam of thickness preferably less than the undeflected length of coil springs 11 has coil spring pockets 12 pierced therein in such a manner as to remove the material from the spring pockets 12 in a unitary plug 13. The plug 13 is then forced into the inside diameter of spring 11 in a coaxial relationship. It is to be understood that plug 13 may be made in any other convenient manner and its density and/or resiliency thus varied. Spring 11 containing plug 13 is then inserted into the spring pocket 12 that has been pierced. Outer sheets 14 and 15 are then glued or otherwise bonded to the core sheet 10, compressing coil springs 11 to establish a preload on the coil springs 11 which will urge core sheet 10 to original thickness after the core assembly is placed under a compressive load and the load is removed, thus preventing the permanent set that could otherwise result. This forms a unitary coil spring reinforced foam core for use in other upholstery applications. The bond lines 16 and 17 may be seen in FIG. 2.

FIG. 2 shows one such application as would be used in a cushion, a partial cross-section of such a cushion being shown. An outer layer of fabric or plastic upholstery material 18 is shown as an outer cover. A layer of fibrous material 19 is interposed between the outer covering of fabric 18 and the outer layers 14 and 15 of the central coil spring unit. This material 19 may also be a foam material if desired. The construction of the central coil foam unit is the same as described for FIG. 1.

FIG. 3 illustrates another embodiment of the invention. Interposed between the center core sheet 10 as previously described in FIG. 1 and the outer sheets 14 and 15 are inter-layer sheets 21 and 22 of stiff sheet material. Outer sheets 14 and 15 are bonded to sheets 21 and 22 which are bonded to center core sheet 10 on bond areas 23, 24, 25, and 26. The inter-layer sheets may be made of a tough fabric such as buckram or canvas, or may be made of a sheet vinyl or other non-cellular plastic adapted with perforations to permit the passage of air. The inter-layer sheets 21 and 22 serve to receive and distribute the force exerted by coil springs 13 to prevent wear of outer sheets 14 and 15.

In FIG. 4 we see another embodiment of the coil spring assembly portion of the invention which uses a tubular fabric sock 30 which is closed at the ends to completely encase the coil spring 11, which in turn is supported by the plug 13. The sock 30 performs the same function as the inter-layer sheets 21 and 22 in receiving and distributing the force exerted by the coil springs 11, and in addition, helps to prevent abrasion during the flexure of the coil spring in the spring pocket 12 of the core sheet 10, as shown in FIG. 1.

Figure 5:
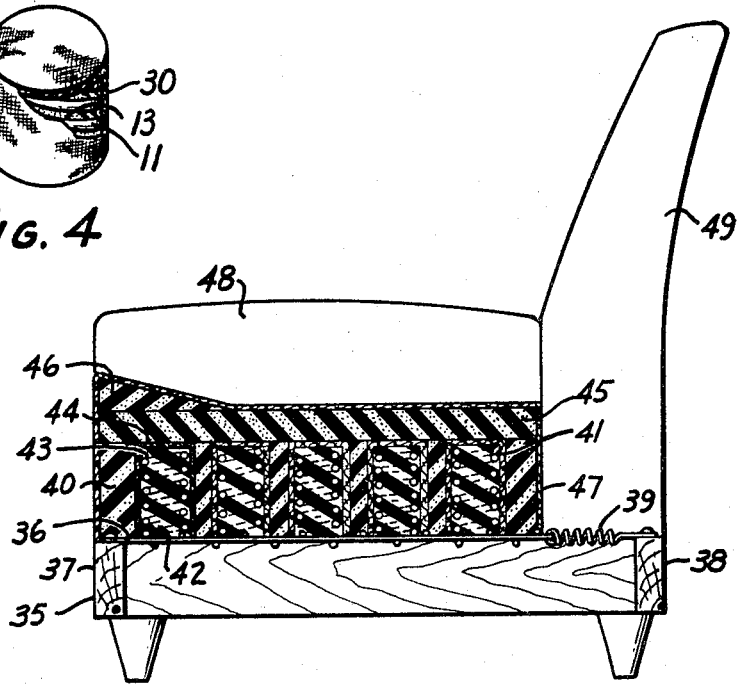
FIG. 5 is a side elevation, partially in cross-section, of an embodiment of the invention in an upholstery base.
Figure 6:
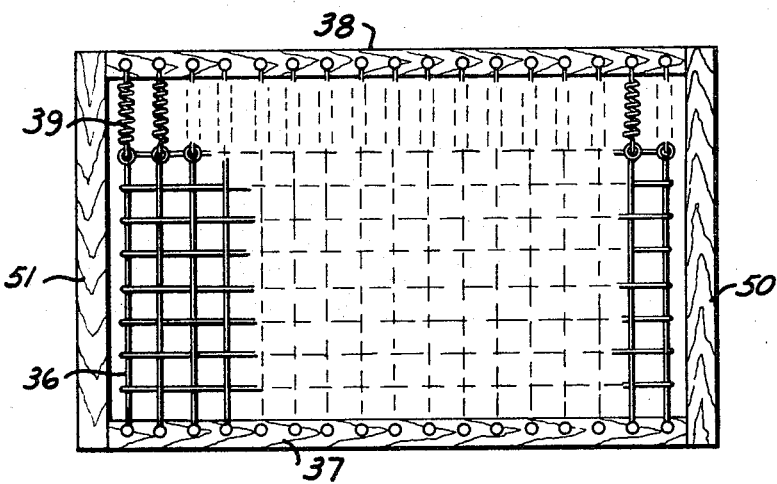
FIG. 6 is a top plan view of the upholstery base of FIG. 5.

Another embodiment of the invention is illustrated in FIGS. 5 and 6. FIG. 5 shows the frame 35 of an article of furniture, such as a sofa. To the frame 35 is fixed a wire mesh 36. The wire mesh is fixed to the front edge 37 of the frame 35 and to the rear edge 38 of the frame 35. The wire mesh is resiliently attached through a series of coil extension springs 39. A core sheet 40 of elastomeric foam has spring pockets 41 formed within it. The plugs 42 cut from the core sheet 40 are placed within the coil spring units 43, and the coil spring 43 and the core 42 assemblies are encased in the fabric socks 44 before the whole spring assembly is placed within the spring pockets 41 of the core sheet 40. A top sheet 45 is bonded to the core sheet 40 and an edge member 46 of similar elastomeric foam material is bonded to the leading edge of the top sheet 45. The entire assembly is then covered by fabric 47 to present a pleasing upholstered appearance and the assembly is then bonded to the wire mesh 36 of the furniture base. The piece of furniture is then completed by the addition of a cushion 48 which may utilize the features of the invention hereinbefore described. The structure for the back 49 would be supported by side rails 49 and 50 and by back rail 38.

This invention may have other embodiments without departing from the spirit or characteristics thereof and the present embodiments shown are therefore to be considered as illustrative and not restrictive and it is intended to include all the changes which are within the scope and range of the claims.

I claim:
1. A coil spring core assembly for use in upholstered furniture which comprises:
   (A) a core sheet, said core sheet in the form of an elastomeric foam sheet, a series of cylindrical pockets cut from said core sheet;
   (B) a plurality of coil spring members, said coil spring members of substantially the same outside diameter as the diameter of said cylindrical pockets;
   (C) a plurality of plugs, said plugs made of elastomeric foam material, said plugs of substantially the same diameter as the diameter of said cylindrical pockets, said plugs adapted to be inserted in said coil springs for reinforcement;
   (D) a plurality of sock members, said sock members adapted to contain said coil spring members with said plugs inserted within said coil spring members, said sock members containing said coil spring members and said plugs adapted to be assembled into said cylindrical pockets of said core sheet;
   (E) a first sheet and a second sheet of elastomeric foam material, said first sheet bonded to one side of said core sheet to cover said coil pockets which contain the assembly of said sock members and said coil spring members and said plugs; said second sheet bonded to the other side of said core sheet to cover said coil pockets,
   said core sheet having a relatively lower density than said first and second sheets of elastomeric foam material and the undeflected length of said coil springs greater in length than the thickness of said core sheet, said coil springs preload said center core sheet.

2. A coil spring core assembly for use in upholstered furniture which comprises:
   (A) a core sheet, said core sheet in the form of an elastomeric foam sheet, a series of cylindrical pockets cut from said core sheet;
   (B) a plurality of coil spring members, said coil spring members of substantially the same outside diameter as the diameter of said cylindrical pockets;
   (C) a plurality of plugs, said plugs made of elastomeric foam material, said plugs of substantially the same diameter as the diameter of said cylindrical pockets, said plugs adapted to be inserted in said coil springs for reinforcement;
   (D) a plurality of sock members, said sock members adapted to contain said coil spring members with said plugs inserted within said coil spring members, said sock members containing said coil spring members and said plugs adapted to be assembled into said cylindrical pockets of said core sheet;
   (E) a frame member;
   (F) a wire mesh member, said wire mesh member resiliently fixed to said frame member, said core sheet bonded to said wire mesh member;
   (G) a top sheet member, said top sheet member bonded to said core sheet to cover said cylindrical spring pockets.

3. Apparatus as described in claim 2 which includes a front edge member, said front edge member bonded to said top sheet member.

4. Apparatus as described in claim 3 which includes a fabric cover, said cover enclosing the assembly of said core sheet, said top sheet member and said front edge member.

5. Apparatus as described in claim 3 which includes said core sheet and said plugs and said top sheet member and said front edge member made of polyurethane cellular material.

6. Apparatus as described in claim 5 which includes said core sheet having a relatively lower density than said top sheet member and said front edge member.

References Cited

UNITED STATES PATENTS

| | | | |
|---|---|---|---|
| 2,236,007 | 3/1941 | Oldham | 5—353 X |
| 2,540,441 | 2/1951 | Gordon | 5—353 |
| 2,913,041 | 11/1959 | Mathison. | |
| 3,031,691 | 5/1962 | Caldemeyer et al. | 5—354 |
| 3,070,814 | 1/1963 | Withoff | 5—354 |
| 3,251,078 | 5/1966 | Calla | 5—353 |
| 3,307,207 | 3/1967 | Cole | 5—351 |
| 3,310,819 | 3/1967 | Morrison | 5—353 |

CASMIR A. NUNBERG, *Primary Examiner.*